UNITED STATES PATENT OFFICE.

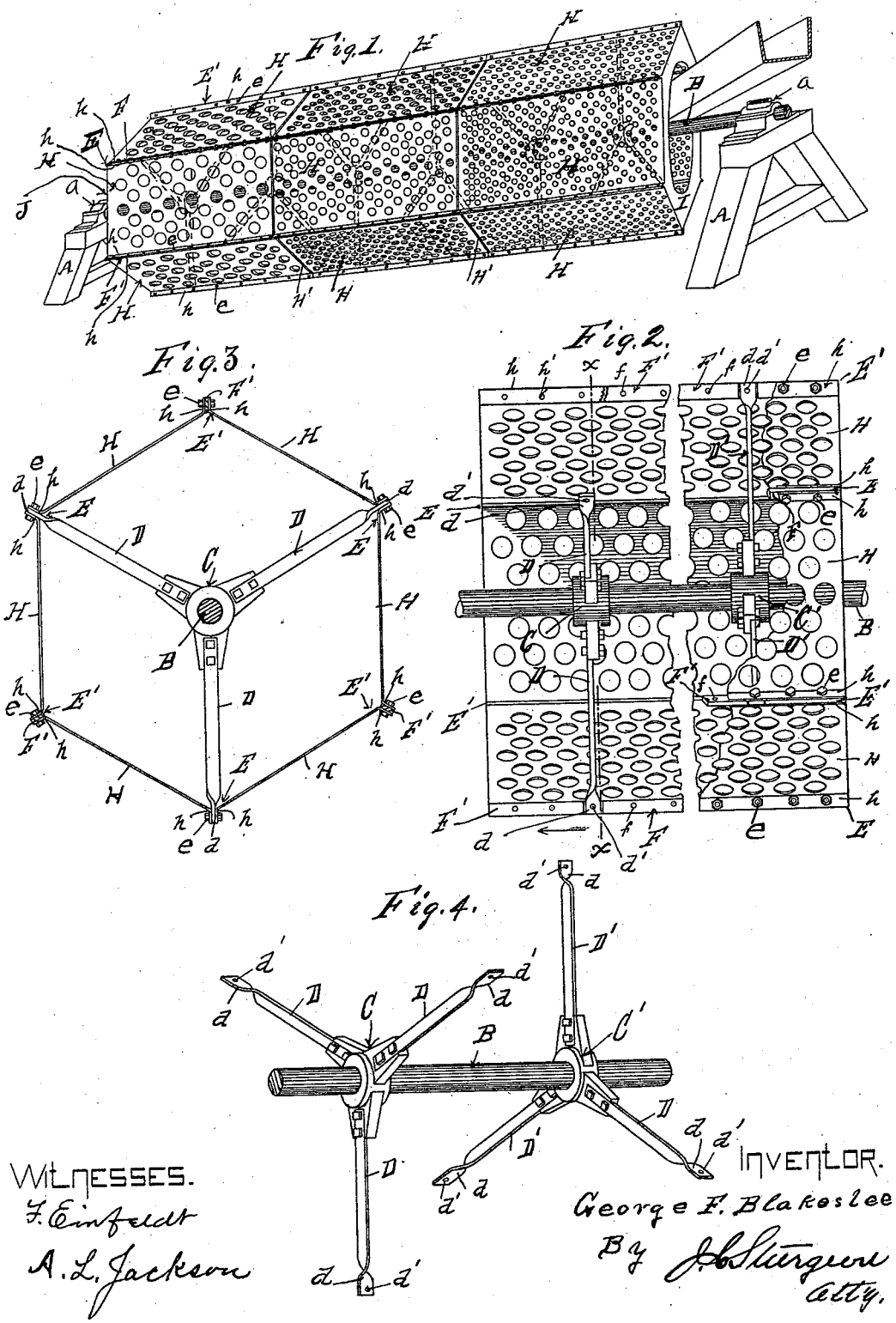

GEORGE F. BLAKESLEE, OF DUQUOIN, ILLINOIS.

COAL-SCREEN.

SPECIFICATION forming part of Letters Patent No. 528,526, dated November 6, 1894.

Application filed January 30, 1894. Serial No. 498,469. (No model.)

*To all whom it may concern:*

Be it known that I, GEORGE F. BLAKESLEE, a citizen of the United States, residing at Duquoin, in the county of Perry and State of Illinois, have invented certain new and useful Improvements in Coal-Screens; and I do hereby declare the following to be a full, clear, and exact description of the invention, such as will enable others skilled in the art to which it appertains to make and use the same, reference being had to the accompanying drawings, and to the letters of reference marked thereon, forming a part of this specification.

My invention consists in the improvements in coal screens, hereinafter described and claimed, and illustrated in the accompanying drawings, in which—

Figure 1. is a perspective view of my improved coal screen. Fig. 2. is a view in elevation of a section of the same, parts thereof being broken away. Fig. 3. is a transverse section of the same on the line $x, x$, in Fig. 2, looking in the direction of the arrow. Fig. 4. is a detail view showing the arrangement of the arms thereof on the shaft.

In constructing my improved coal screen, as hereinafter described, I make it multiple sided and so that the arrangement of the arms therein operates to so support the frame work and perforated plates forming the screen, that I can make the screen much longer in proportion to its diameter than can be done in the constructions heretofore used, and the perforated plates forming the shell of the screen being flanged outward at their edges operate, together with the longitudinal bars between the arms, to form part of the screen frame, and present no ridges on the inside of the screen to obstruct its operation, while it enables me to remove any one of the perforated plates forming the shell of the screen and replace it with a new one. I make my improved screen multiple sided, preferably hexagonal or octagonal, thus presenting the necessary corners for joining the arms to the outwardly flanged perforated plates forming the sides of the screen.

In the construction of my improved coal screen, shown in the drawings, I have illustrated a hexagonal screen embodying my improvements, in which—

A, A, represent supports for boxes $a, a$ in which the central shaft B of the screen is mounted, the mechanism for rotating said shaft not being shown as it forms no part of my invention. Upon the shaft B, I secure spiders C and C' at such distances apart as the strength of the screen to be constructed may require; these spiders C and C' being secured to the shaft B, as illustrated in Figs. 3 and 4, so that arms D secured to the spiders C will extend outward to and be secured in the corners E of the screen, and arms D' secured to the spiders C' will extend outward to and be secured in the alternate corners E' of the screen.

The arms D and D' I preferably make of flat bars of metal having their outer ends $d$ twisted, so that the bolts $e$ passing through the flanges on the perforated screen plates hereinafter described will pass through the holes $d'$ in them. In the corners E and E' of the screen are flat longitudinal bars F and F' of the same thickness as the ends $d$ of the arms D and D', the bars F in the corners E extending from one set of the arms D to the next set of the arms D, and the bars F' in the corners E' extending from one set of the arms D' to the next set of the arms D', so that the joints formed by the arms D and D' at the corners E and E' of the screen are supported by the alternate bars F and F'. These bars F and F' are perforated with bolt holes $f$ (see Fig. 2) so that the bolts $e$ passing through the flanges on the perforated screen plates hereinafter described will pass through them.

The shell of the screen is formed of any desired number of flat perforated plates H having their opposite sides provided with outwardly projecting flanges $h$, which flanges $h$ are provided with bolt holes $h'$ uniform with the holes $f$ in the longitudinal bars F and F' and the holes $d'$ in the ends $d$ of the arms D and D', so that the frame work and the perforated plates H forming the shell of the screen are secured together by means of the bolts $e$. The perforated plates H are preferably made of uniform length, and the ends H' thereof simply meet longitudinally, and are not secured together, so that by removing the bolts $e$ through the flanges $h$ of any one plate, it can be removed and replaced by a new one without disturbing any of the other plates.

In Fig. 1, of the drawings, I show a screen made with three sets of plates H, the perforations therein increasing in size from the receiving end I toward the discharge end J of the screen, but if desired I can use plates having perforations uniform throughout the entire length of the screen, as this feature forms no part of my invention.

Having thus fully described my invention, so as to enable others to construct and use the same, what I claim as new, and desire to secure by Letters Patent of the United States, is—

1. The combination in a multiple sided coal screen, of a central shaft, sets of arms extending outwardly from said shaft and secured to alternate corners of the sides of the screen shell, longitudinal bars at the corners of the screen extending from one set of the arms to the next alternate set of the arms, flat perforated plates, having their edges flanged so as to fit against the ends of the arms and the bars forming the corners of the screen, and bolts passing through said flanges and bars and through the ends of the arms, substantially as and for the purpose set forth.

2. The combination in a multiple sided screen, of a central shaft B, spiders C and C' secured to said shaft, arms D and D' having bolt holes $d'$ in the ends thereof and extending outwardly therefrom and secured in alternate corners of said screen, longitudinal bars F extending from the arms D to the next alternate set of arms D, and having bolt holes $f$ therein, longitudinal bars F' extending from the arms D' to the next alternate set of arms D' and having bolt holes $f$ therein, perforated plates H having longitudinal flanges $h$ and bolt holes $h'$ therein, and bolts $e$ passing through the bolt holes $h'$ in the flanges, the bolt holes $f$ in the bars F and F' and the bolt holes $d$ in the ends of the arms D and D', substantially as and for the purpose set forth.

In testimony whereof I affix my signature in presence of two witnesses.

GEORGE F. BLAKESLEE.

Witnesses:
C. A. KAUFFMANN,
GEO. C. VAN KEUREN.